(12) United States Patent
Nilsson et al.

(10) Patent No.: US 11,123,753 B2
(45) Date of Patent: Sep. 21, 2021

(54) CENTRIFUGAL SEPARATOR WITH DISC HAVING REGIONS OF DIFFERENT DENSITIES OF SPACING MEMBERS

(71) Applicant: ALFA LAVAL CORPORATE AB, Lund (SE)

(72) Inventors: Sven-Åke Nilsson, Gnesta (SE); Peter Thorwid, Sundbyberg (SE)

(73) Assignee: ALFA LAVAL CORPORATE AB, Lund (SE)

( * ) Notice: Subject to any disclaimer, the term of this patent is extended or adjusted under 35 U.S.C. 154(b) by 273 days.

(21) Appl. No.: 16/346,000

(22) PCT Filed: Oct. 25, 2017

(86) PCT No.: PCT/EP2017/077248
§ 371 (c)(1),
(2) Date: Apr. 29, 2019

(87) PCT Pub. No.: WO2018/077921
PCT Pub. Date: May 3, 2018

(65) Prior Publication Data
US 2019/0262843 A1 Aug. 29, 2019

(30) Foreign Application Priority Data
Oct. 31, 2016 (EP) ..................... 16196562

(51) Int. Cl.
*B04B 7/14* (2006.01)
*B04B 1/08* (2006.01)
(Continued)

(52) U.S. Cl.
CPC .................. *B04B 7/14* (2013.01); *A23C 9/14* (2013.01); *A23C 13/12* (2013.01); *B04B 1/08* (2013.01)

(58) Field of Classification Search
CPC .... B04B 7/14; B04B 1/08; A23C 9/14; A23C 13/12
(Continued)

(56) References Cited

U.S. PATENT DOCUMENTS 1,006,622 A 10/1911 Bailey
1,602,752 A 10/1926 Cuthbert
(Continued)

FOREIGN PATENT DOCUMENTS

CN 1042671 A 6/1990
CN 1179736 A 4/1998
(Continued)

OTHER PUBLICATIONS

International Search Report, issued in PCT/EP2017/077238, dated Jan. 22, 2018.
(Continued)

*Primary Examiner* — Charles Cooley
(74) *Attorney, Agent, or Firm* — Birch, Stewart, Kolasch & Birch LLP (57) ABSTRACT

A centrifugal separator (14) comprises a stationary frame (15), a spindle (16) rotatably supported by the frame, a centrifuge rotor 17 mounted to a first end of the spindle to rotate together with the spindle around an axis (X2) of rotation. A stack (10) of separation discs (1) is arranged to rotate coaxially with the centrifuge rotor The stack of separation discs comprises a set of axially aligned separation discs with an inner surface and an outer surface and a plurality spot-formed spacing members extending from a base from at least one of the inner surface and the outer surface The surface density of said spot-formed spacing members is above 25 spot-formed spacing members/dm² throughout the inner and/or outer surface of the separation disc. A first region at a bottom of the discs has a higher
(Continued)

density of the spot-formed spacing members than a second region.

18 Claims, 6 Drawing Sheets

(51) Int. Cl.
  *A23C 9/14* (2006.01)
  *A23C 13/12* (2006.01)
(58) Field of Classification Search
  USPC ............................................. 494/70–73
  See application file for complete search history.

(56) References Cited

U.S. PATENT DOCUMENTS

| | | | |
|---|---|---|---|
| 2,028,955 A * | 1/1936 | Shenstone | B04B 7/14 494/70 |
| 2,599,619 A | 6/1952 | Eckers | |
| 2,725,190 A | 11/1955 | Hein et al. | |
| 3,335,946 A * | 8/1967 | Putterlik | B04B 7/14 494/73 |
| 3,409,521 A | 11/1968 | Sharples | |
| 4,036,429 A | 7/1977 | Ivin et al. | |
| 4,142,671 A | 3/1979 | Ivin et al. | |
| 4,262,841 A | 4/1981 | Berber et al. | |
| 4,622,029 A | 11/1986 | Nilsson | |
| 4,861,329 A | 8/1989 | Borgstrom | |
| 5,637,217 A | 6/1997 | Herman et al. | |
| 5,720,705 A | 2/1998 | Inge et al. | |
| 5,883,354 A | 3/1999 | Elofson | |
| 6,526,794 B1 | 3/2003 | Langer et al. | |
| 8,454,487 B2 * | 6/2013 | Lindroth | B04B 1/08 494/70 |
| 8,562,503 B2 | 10/2013 | Rudman et al. | |
| 8,678,989 B2 | 3/2014 | Rudman et al. | |
| 9,550,192 B2 | 1/2017 | Klintenstedt | |
| 9,687,858 B2 | 6/2017 | Quiter | |
| 9,849,467 B2 * | 12/2017 | Hagqvist | B04B 1/08 |
| 9,914,138 B2 * | 3/2018 | Nilsson | B04B 1/08 |
| 10,118,184 B2 | 11/2018 | Inge et al. | |
| 10,960,411 B2 * | 3/2021 | Nilsson | B21D 22/16 |
| 10,960,412 B2 * | 3/2021 | Nilsson | B04B 1/08 |
| 11,027,291 B2 * | 6/2021 | Nilsson | B04B 7/14 |
| 2001/0016549 A1 | 8/2001 | Herman et al. | |
| 2003/0178014 A1 | 9/2003 | Sauter et al. | |
| 2006/0100083 A1 | 5/2006 | Lagerstedt et al. | |
| 2008/0015099 A1 | 1/2008 | Heinrich | |
| 2010/0011723 A1 | 1/2010 | Szepessy et al. | |
| 2011/0136649 A1 | 6/2011 | Lindroth et al. | |
| 2011/0195832 A1 | 8/2011 | Rudman et al. | |
| 2012/0174547 A1 | 7/2012 | Törnblom et al. | |
| 2013/0067873 A1 | 3/2013 | Szepessy et al. | |
| 2014/0148327 A1 * | 5/2014 | Nilsson | B21D 22/16 494/70 |
| 2015/0045199 A1 * | 2/2015 | Thorwid | B04B 1/08 494/2 |
| 2016/0001302 A1 | 1/2016 | Quiter et al. | |
| 2016/0303579 A1 | 10/2016 | Nilsson | |
| 2018/0147580 A1 * | 5/2018 | Nilsson | B21D 22/16 |
| 2019/0247865 A1 * | 8/2019 | Nilsson | B04B 1/08 |
| 2019/0247866 A1 * | 8/2019 | Nilsson | B04B 7/14 |
| 2019/0262843 A1 | 8/2019 | Nilsson et al. | |
| 2021/0107014 A1 * | 4/2021 | Hilding | B04B 1/08 |

FOREIGN PATENT DOCUMENTS

| | | |
|---|---|---|
| CN | 1615179 A | 5/2005 |
| CN | 1832807 A | 9/2006 |
| CN | 1942248 A | 4/2007 |
| CN | 101619018 A | 1/2010 |
| CN | 101862706 A | 10/2010 |
| CN | 101884957 A | 11/2010 |
| CN | 102083541 A | 6/2011 |
| CN | 102099120 A | 6/2011 |
| CN | 102227265 A | 10/2011 |
| CN | 102227266 A | 10/2011 |
| CN | 102821866 A | 12/2012 |
| CN | 103357511 A | 10/2013 |
| CN | 103357515 A | 10/2013 |
| CN | 103702763 A | 4/2014 |
| CN | 104284732 A | 1/2015 |
| CN | 105188946 A | 12/2015 |
| CN | 105813772 A | 7/2016 |
| CN | 107771103 A | 3/2018 |
| DE | 37 14399 C1 | 4/1988 |
| DE | 195 37 268 C1 | 2/1997 |
| DE | 69606973 T2 | 6/2000 |
| EP | 0 806 985 B1 | 7/2002 |
| GB | 466971 A | 6/1937 |
| GB | 711695 | 7/1954 |
| GB | 1 330 097 | 9/1973 |
| JP | 2001-505476 A | 4/2001 |
| JP | 2002-239414 A | 8/2002 |
| JP | 2010-274210 A | 12/2010 |
| KR | 10-92-006647 B1 | 8/1992 |
| KR | 10-2014-0034299 A | 3/2014 |
| RU | 17286-Ua | 3/2001 |
| SE | 23367 | 7/1906 |
| SE | 528 844 C2 | 2/2007 |
| SE | 532 153 C2 | 11/2009 |
| SU | 797778 A1 | 1/1981 |
| SU | 1261715 A1 | 10/1986 |
| WO | WO 90/05028 A1 | 5/1990 |
| WO | WO 96/27445 A1 | 9/1996 |
| WO | WO 2007/055630 A1 | 5/2007 |
| WO | WO 2009/051545 A1 | 4/2009 |
| WO | WO 2009/126104 A1 | 10/2009 |
| WO | WO 2010/039097 A1 | 4/2010 |
| WO | 2013/020978 A1 * | 2/2013 |
| WO | WO 2013/020978 A1 | 2/2013 |
| WO | 2013/079194 A2 * | 6/2013 |
| WO | WO 2013/079194 A2 | 6/2013 |
| WO | WO 2016/046944 A1 | 3/2016 |

OTHER PUBLICATIONS

International Search Report, issued in PCT/EP2017/077248, dated Jan. 17, 2018.
International Search Report, issued in PCT/EP2017/077284, dated Jan. 17, 2018.
Written Opinion of the International Searching Authority, issued in PCT/EP2017/077238, dated Jan. 22, 2018.
Written Opinion of the International Searching Authority, issued in PCT/EP2017/077248, dated Jan. 17, 2018.
Written Opinion of the International Searching Authority, issued in PCT/EP2017/077284, dated Jan. 17, 2018.
U.S. Office Action, dated Oct. 7, 2020, for U.S. Appl. No. 15/882,695.
English translation of the Korean Office Action for Korean Application No. 10-2019-7015262, dated Jun. 19, 2020.
English translation of the Russian Decision on Grant for Russian, dated Jun. 23, 2016 for Russian Application No. 2014108871/05.
European Office Action, dated, Nov. 3, 2016, for European Application No. 12743740.8.
International Search Report, issued in PCT/EP2012/065439, dated Jan. 24, 2013.
U.S. Office Action, dated May 29, 202 for U.S. Appl. No. 16/342,095.
U.S. Office Action, dated May 29, 2020, for U.S. Appl. No. 16/342,103.
Written Opinion of the International Searching Authority, issued in PCT/EP2012/065439, dated Jan. 24, 2013.
U.S. Appl. No. 15/882,695, filed Jan. 29, 2018.

* cited by examiner

CENTRIFUGAL SEPARATOR WITH DISC HAVING REGIONS OF DIFFERENT DENSITIES OF SPACING MEMBERS

FIELD OF THE INVENTION

The present invention relates to the field of centrifugal separation, and more specifically to centrifugal separators comprising a stack of separation discs.

BACKGROUND OF THE INVENTION

Centrifugal separators are generally used for separation of liquids and/or solids from a liquid mixture or a gas mixture. During operation, fluid mixture that is about to be separated is introduced into a rotating bowl and due to the centrifugal forces, heavy particles or denser liquid, such as water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

Separation discs are stacked in the rotating bowl at a mutual distance to form interspaces between themselves, thus forming surface-enlarging inserts within the bowl. Separation discs of metal are used in connection with relatively robust and large-sized centrifugal separators for separating liquid mixtures; wherein the separation discs are of relatively large size and exposed to both high centrifugal and liquid forces. One application in which large centrifugal separators are used is in the dairy industry, such as in the continuous centrifugal separation of milk into a cream phase and a skim milk phase. During operation, the skim milk moves outwards in the interspaces between discs in the stack of separation discs used in the centrifugal separator, whereas the cream, i.e. the fat globules, having a lower density than the skim milk moves radially inwards towards the axis of rotation. Both phases may thus be collected via the different outlets.

The skimming ability of a milk separator, i.e. the amount of fat that can be separated from the milk, depends on different factors such as the size distribution of the fat globules but also on the specific design of the centrifugal separator and the rate at which the milk is supplied to the separator. A lower flow rate through the centrifugal separator gives the fat more time to be separated in the interspaces in the disc stack, which thus leads to a high skimming efficiency. Thus, the skimming efficiency is in inverse proportion to the flow rate of milk through the centrifugal separator.

Document WO2009126104 shows an example of a centrifugal separator used for separation of milk as well as separation discs that may be used in the disc stack of such a milk separator. The separation discs comprise a number of elongated radial caulks or spacing members for providing interspaces between discs in the stack. The discs in the stack are usually compressed with high force in order to fit as many discs as possible in the stack, and the separation discs are arranged in the disc stack so that these radially extending spacing members are axially aligned. In this way, the elongated spacing members can bear the high compression forces and thus prevent separation discs from deforming under the high compression force.

However, there is a need in the art for large-sized centrifugal separator, such as a centrifugal separator for separating milk, which allows for the use of a higher flow rate while retaining high separation efficiency.

SUMMARY OF THE INVENTION

A main object of the present invention is to provide a centrifugal separator that can manage a high flow rate while retaining a high separation capacity.

As a first aspect of the invention there is provided a centrifugal separator for separation of at least two components of a fluid mixture which are of different densities, which centrifugal separator comprises
- a stationary frame,
- a spindle rotatably supported by the frame,
- a centrifuge rotor mounted to a first end of the spindle to rotate together with the spindle around an axis (X) of rotation, wherein the centrifuge rotor comprises a rotor casing enclosing a separation space in which a stack of separation discs is arranged to rotate coaxially with the centrifuge rotor,
- a separator inlet extending into said separation space for supply of the fluid mixture to be separated,
- a first separator outlet for discharging a first separated phase from said separation space,
- a second separator outlet for discharging a second separated phase from said separation space;
- wherein said stack of separation discs comprises a set of axially aligned separation discs having a truncated conical shape with an inner surface and an outer surface and comprising a plurality spot-formed spacing members extending from a base from at least one of the inner surface and the outer surface for providing interspaces between mutually adjacent separation discs,
- wherein said set of separation discs comprises at least 200 separation discs having a diameter of at least 300 mm, and
- wherein the surface density of said spot-formed spacing members is above 25 spot-formed spacing members/dm$^2$ throughout the inner and/or outer surface of the separation disc.

The centrifugal separator is for separation of a fluid mixture, such as a gas mixture or a liquid mixture. The stationary frame of the centrifugal separator is a non-rotating part, and the spindle is supported in the frame by at least one bearing device, such as by at least one ball-bearing.

The centrifugal separator may further comprise a drive member arranged for rotating the spindle and the centrifuge rotor mounted on the spindle. Such a drive member for rotating the spindle and centrifuge rotor may comprise an electrical motor having a rotor and a stator. The rotor may be provided on or fixed to the spindle so that it transmits driving torque to the spindle and hence to the centrifuge rotor during operation.

Alternatively, the drive member may be provided beside the spindle and rotate the spindle and centrifuge rotor by a suitable transmission, such as a belt or a gear transmission.

The centrifuge rotor is adjoined to a first end of the spindle and is thus mounted to rotate with the spindle. During operation, the spindle thus forms a rotating shaft. The first end of the spindle may be an upper end of the spindle. The spindle is thus rotatable around the axis of rotation (X).

The spindle and centrifuge rotor may be arranged to rotate at a speed of above 3000 rpm, such as above 3600 rpm.

The centrifuge rotor further encloses a separation space in which the separation of the fluid mixture takes place. Thus, the centrifuge rotor forms a rotor casing for the separation space. The separation space comprises a stack of separation discs arranged centrally around the axis of rotation and comprising the set of separation discs that comprises the spot-formed spacing members. The "set" of separation discs may be the whole stack of separation discs, or constitute at least 50% of the whole stack of separation discs, such as at least 75% of the whole stack of separation discs. The separation discs thus form surface enlarging inserts in the separation space. The separation discs may be stacked in the separation space at a mutual distance to form interspaces between themselves. The fluid mixture to be separated in the centrifugal rotor is conducted through the interspaces, wherein the mixture is separated into phases of different densities during operation of the centrifugal separator. The interspaces are provided by said spacing members arranged on the surface of each separation disc.

The separation discs may e.g. comprise a metal or be of metal material, such as stainless steel.

The separation discs may further comprise a plastic material or be of a plastic material.

A truncated conical shape refers to a shape that is frustoconical, i.e. having the shape of a frustum of a cone, which is the shape of a cone with the narrow end, or tip, removed. The axis of the truncated conical shape thus defines the axial direction of the separation disc, which is the direction of the height of the corresponding conical shape or the direction of the axis passing through the apex of the corresponding conical shape.

The inner surface is thus the surface facing the axis whereas the outer surface is the surface facing away from the axis of the truncated cone. The spot-formed spacing-members may be provided only on the inner surface, only at the outer surface or on both the inner and outer surface of the truncated conical shape.

Half of the opening angle of the frustoconical shape is usually defined as the "alpha angle". As an example the separation disc may have an alpha angle between 25° and 45°, such as between 35° and 40°. A spacing member is a member on the surface of a disc that spaces two separation discs apart when they are stacked on top of each other, i.e. defining the interspace between the discs.

The separator inlet for fluid mixture, i.e. feed, that is to be separated may be a stationary pipe arranged for supplying the feed to the separation space. The inlet may also be provided within a rotating shaft, such as within the spindle.

In embodiments of the first aspect of the invention, the spindle is hollow and forms part of said separator inlet so that the fluid mixture to be separated is supplied through said spindle.

Thus, the fluid mixture to be separated may be supplied from the bottom of the rotor.

The first separator outlet for discharging a first separated phase from the separation space may be a first liquid outlet.

The second separator outlet for discharging a second separated phase from the separation space may be a second liquid outlet. Thus, the separator may comprise two liquid outlets, wherein the second liquid outlet is arranged at a larger radius from the rotational axis as compared to the first liquid outlet. Thus, liquids of different densities may be separated and be discharged via such first and second liquid outlets, respectively.

The separated liquid of lowest density may be discharged via the first separator outlet whereas the separated liquid phase of higher density may be discharged via the second separator outlet, respectively.

During operation, a sludge phase, i.e. mixed solid and liquid particles forming a heavy phase, may be collected in an outer peripheral part of the separation space. Therefore, the second separator outlet for discharging a second separated phase from the separation space may comprise outlets for discharging such a sludge phase from the periphery of the separation space. The outlets may be in the form of a plurality of peripheral ports extending from the separation space through the centrifuge rotor to the rotor space between the centrifuge rotor and the stationary frame. The peripheral ports may be arranged to be opened intermittently, during a short period of time in the order of milliseconds, to enable discharge of a sludge phase from the separation space to the rotor space. The peripheral ports may alternatively be in the form of nozzles that are constantly open during operation to allow a constant discharge of sludge.

However, the second separator outlet for discharging a second separated phase from the separation space may be a second liquid outlet, and the centrifugal separator may further comprise a third separator outlet for discharging a third separated phase from the separation space. Consequently, in embodiments of the first aspect of the invention, the separator comprises a third separator outlet for discharging a sludge phase from the periphery of the separation space.

Such a third separator outlet comprise outlets for discharging a sludge phase from the periphery of the separation space, as discussed above, and may be in the form of a plurality of peripheral ports arranged to be opened intermittently or in the form of nozzles that are constantly open during operation to allow a constant discharge of sludge.

The first aspect of the invention is based on the insight that a separation discs having a large amount of spot-formed spacing members may facilitate a higher flow rate in large centrifugal separators, i.e. separators having more than 200 separation discs with a diameter of above 300 mm. Surprisingly, these large amounts of spot-formed spacing members, i.e. with a surface density of above 25 spot-formed spacing members/$dm^2$, can bear the large compression forces encountered in such a large disc stack. This may facilitate the use of thinner separation discs and reduce the need for conventional elongated and radially extending caulks. Further, the inventors have surprisingly found that even though the disc stack of such a separator comprises a vast number of spacing members provided with a high surface density, the disc stack is well-balanced and thus suitable for liquid separation in a large centrifugal separator.

Experimental examples when studying the skimming efficiency of a milk separator, i.e. a study of the fat content in the separated skimmed milk phase, have shown that a disc stack comprising a large amount of spot-formed spacing members as load-bearing elements (more than 4000 spot-formed spacing members per separation disc provided on the inner surface of the discs) outperforms a corresponding disc stack having conventional spacing members as load-bearing elements. When studying the fat content in skim milk versus flow rate, it was found that the disc stack having spot-formed spacing members performed equally well, i.e. had the same skimming efficiency, at a flow rate of 62-65 $m^3$/h as the standard disc stack had at a flow rate of 53 $m^3$/h.

A centrifugal separator according to the present disclosure may thus be used within the dairy industry for separating milk, but also within other industries, such as brewery and life science.

In embodiments of the first aspect of the invention, the spot-formed spacing members are provided solely on either the inner or the outer surface of the separation disc.

In embodiments of the first aspect of the invention, at least one of said inner surface and said outer surface of said set of separation discs comprising spot-formed spacing members are free of spacing members other than said spot-formed spacing members.

As an example, both the inner and the outer surface, i.e. the whole disc, may be free of spacing members other than said spot-formed spacing members.

This means that in a compressed stack of such separation discs, all interspaces between the discs in the stack are defined by the spot-formed spacing members.

However, the separation discs in the disc stack may also comprise spacing members other than the spot-formed spacing members, such as spacing members in the form of radial strips. These may be in the form of separate pieces of narrow strips or circular blanks of sheet metal, which are attached to the surface of the separation disc. Such radial strips, or elongated and radially extending spacing members, may have a length that is above 20 mm, such as above 50 mm, and e.g. a width that is above 4 mm.

In embodiments of the first aspect of the invention, the separation discs in the set of disc having spot-formed spacing members comprises less than 5 elongated and radially extending spacing members, such as less than 4, such as less than 3, such as less than 2, such as no radially extending spacing members.

Further, in embodiments of the first aspect of the invention, the separation discs in the set of disc having spot-formed spacing members comprises less than 5 spacing members other than the spot-formed spacing members, such as less than 4, such as less than 3, such as less than 2 such as no other spacing members than the spot-formed spacing members.

Thus, both the inner and the outer surface of at least one disc in the set of separation disc may be free of spacing members other than said spot-formed spacing members for creating interspaces between the discs in the stack.

Consequently, in embodiments of the first aspect of the invention, the stack of separation discs is arranged so that said spot-formed spacing members are the major load-bearing elements in said stack of separation discs.

This means that a majority of the compression forces are held by spot-formed spacing members in the disc stack.

In embodiments of the first aspect of the invention, the spot-formed spacing members in the set of separation discs are provided in an amount so that more than half of the total area of a disc surface occupied by spacing members is defined by said spot-formed spacing members. Consequently, in embodiments of the first aspect of the invention, said spot-formed spacing members form a majority of all spacing members on the separation disc.

As an example, more than 75%, such as all, total area of a disc surface occupied by spacing members may be defined by said spot-formed spacing members.

This means that in a compressed stack of such separation discs, a majority or all compressive forces are supported by the spot-formed spacing members.

Thus, the set of separation discs having spot-formed spacing members, and also the whole disc stack, may comprise solely spot-formed spacing members as load-bearing elements.

The inventors have found that the spot-formed spacing members are suitable in large centrifugal separators. Thus, in embodiments of the first aspect of the invention said set of axially aligned separation discs comprises at least 250 separation discs.

As an example, the set of axially aligned separation discs may comprise at least 270 separation discs, such as at least 300 separation discs Furthermore, in embodiments of the first aspect of the invention, said set of axially aligned separation discs has a diameter of at least 350 mm, such as at least 400 mm, such as at least 450 mm, such as at least 500 mm, such as at least 530 mm.

Moreover, the surface density of said spot-formed spacing members may be above 50 spacing members/dm$^2$ throughout the inner and/or outer surface of the separation disc. As an example, the surface density of said spot-formed spacing members may be above 75 spacing members/dm$^2$, such as above 90 spacing members/dm$^2$, such as about or above 100 spacing members/dm$^2$ throughout the inner and/or outer surface of the separation disc.

Further, in embodiments of the first aspect of the invention, the inner or outer surface of the separation disc has a surface density of said spot-formed spacing members that is above 10 spacing members/dm$^2$, such as above 25 spacing members/dm$^2$, such as above 50 spacing members/dm$^2$, such as above 75 spacing members/dm$^2$, such as about or above 100 spacing members/dm$^2$, and the separation disc may have a thickness that is less than 0.40 mm, such as less than 0.30 mm.

However, the whole inner or outer surface does not have to be covered with the spot-formed spacing members. The spot-formed spacing members may be equally distributed on a surface or distributed in clusters For example, the set of separation discs may have a diameter that is more than 300 mm and comprise more than 300 spot-formed spacing members, such as more than 600 spot-formed spacing members, such as more than 1000 spot-formed spacing members, such as more than 1300 spot-formed spacing members, on each disc, and each disc may optionally have a thickness that is less than 0.40 mm, such as less than 0.30 mm.

For example, the set of separation discs may have a diameter that is more than 350 mm and comprise more than 450 spot-formed spacing members, such as more than 900 spot-formed spacing members, such as more than 1400 spot-formed spacing members, such as more than 1800 spot-formed spacing members, on each disc, and each disc may optionally have a thickness that is less than 0.40 mm, such as less than 0.30 mm.

As a further example, the set of separation discs may have a diameter that is more than 400 mm and comprise more than 600 spot-formed spacing members, such as more than 1100 spot-formed spacing members, such as more than 1700 spot-formed spacing members, such as more than 2200 spot-formed spacing members, on each disc, and each disc may optionally have a thickness that is less than 0.40 mm, such as less than 0.30 mm.

As a further example, the set of separation discs may have a diameter that is more than 450 mm and comprise more than 700 spot-formed spacing members, such as more than 1400 spot-formed spacing members, such as more than 1900 spot-formed spacing members, such as more than 2800 spot-formed spacing members, on each disc, and each disc may optionally have a thickness that is less than 0.40 mm, such as less than 0.30 mm.

As a further example, the set of separation discs may have a diameter that is more than 500 mm and comprise more than 900 spot-formed spacing members, such as more than 1800 spot-formed spacing members, such as more than 2700 spot-formed spacing members, such as more than 3600 spot-formed spacing members, on each disc, and each disc may optionally have a thickness that is less than 0.40 mm, such as less than 0.30 mm.

As a further example, the set of separation discs may have a diameter that is more than 530 mm and comprise more than 1000 spot-formed spacing members, such as more than 2000 spot-formed spacing members, such as more than 3000 spot-formed spacing members, such as more than 4000 spot-formed spacing members, on each disc, and each disc may optionally have a thickness that is less than 0.40 mm, such as less than 0.30 mm.

The set of separation discs may comprise more than 250, such as more than 275, such as more than 300, of the above exemplified types of separation discs.

As an example, all discs of the stack comprising spot-formed spacing members may have the same number of spot-formed spacing members.

In embodiments of the first aspect of the invention, the set or number of separation discs having spot-formed spacing members may be more than 50% of the total number of separation discs in the stack of separation discs, such as more than 75% of the total number of separation discs in the stack of separation discs, such as more than 90% of the total number of separation discs in the stack of separation discs. As an example, all discs of the disc stack may be discs having spot-formed spacing members.

In embodiments of the first aspect of the invention, a majority of all discs in the stack are discs having said spot-formed spacing members.

As an example, the stack may comprise more than 200 separation discs and more than 90% of those separation discs, such as all separation discs, may be separation discs having spot-formed spacing members.

As an example, the stack may comprise more than 300 separation discs and more than 90% of those separation discs, such as all separation discs, may be separation discs having spot-formed spacing members.

The width of the base of the spot-formed spacing member may refer to or correspond to the diameter of the spot-formed spacing member at the surface. If the base at the surface has an irregular shape, the width of the spot-formed spacing member may correspond to the largest extension of the base at the surface.

In embodiments of the first aspect of the invention, the base of the spot-formed spacing members extend to a width which is less than 5 mm along the surface of the separation disc. As an example, said base of said spot-formed spacing member may extend to a width which is less than 2 mm along the surface of the separation disc, such as to a width which is less than 1.5 mm along the surface of the separation disc, such as to a width which is about or less than 1 mm along the surface of the disc.

Thus, due to a small size compared to the "conventional" large-sized spacing members in the form of e.g. elongated strips, the spacing members may be provided in greater number without blocking or significantly impeding the flow of fluid mixture between the discs in a stack of separation discs.

In embodiments of the first aspect of the invention, the separator comprises means for supplying the fluid mixture to be separated at a flow rate that is above 55 m$^3$/hour, such as above 60 m$^3$/hour, such as above 65 m$^3$/hour, such as above 70 m$^3$/hour.

In certain separator applications, the separation fluid during the separation process is kept under special hygienic conditions and/or without any air entrainment and high shear forces, such as when the separated product is sensitive to such influence. Examples of that kind are separation of dairy products, beer and in biotechnology applications. For such applications, so called hermetic separators have been developed, in which the separator bowl or centrifuge rotor is completely filled with liquid during operation. This means that no air or free liquid surfaces is meant to be present in the rotor during operation of the centrifugal separator.

In embodiments of the first aspect of the invention, at least one of said separator inlet, first separator outlet or second separator outlet is mechanically hermetically sealed.

Hermetic seals reduce the risk of oxygen or air getting into the separation space and contact the liquid to be separated.

Accordingly, in embodiments of the first aspect of the invention, the centrifugal separator is for separating dairy products, such as separating milk into cream and skimmed milk.

In embodiments of the first aspect of the invention, the set of separation discs having spot-formed spacing members are arranged so that a majority of said spot-formed spacing members of a disc are displaced compared to the spot-formed spacing members of an adjacent disc.

A spot-formed spacing member being "displaced" compared to a spot-formed spacing member on an adjacent disc refers to the discs being arranged so that said spot-formed spacing member is not at the same position as a spot-formed spacing member on an adjacent disc. Thus, a spot-formed spacing member being displaced does not abut an adjacent disc at a position where the adjacent disc has a spot-formed spacing member.

Hence, the discs having spot-formed spacing members may arranged so that the spot-formed spacing members of a disc are not axially aligned with a spot-formed spacing member of an adjacent disc. Thus, the spot-formed spacing members may be radially displaced in relation to the spot-formed spacing members of adjacent discs as seen in an axial plane through the axis of rotation, and/or the spot-formed spacing members may be circumferentially displaced in relation to the spot-formed spacing members of adjacent discs as seen in a radial plane through the axis of rotation.

Displacement of spot-formed spacing members may be achieved by a disc being turned in the circumferential direction compared to an adjacent disc, such as turned through a predetermined angle in a circumferential direction. Thus, some or each separation disc may be gradually turned through an angle in the circumferential direction as the separation discs are being stacked on top of each other to form the stack. Accordingly, separation discs having the same pattern of spot-formed spacing members may be arranged in a stack of separation discs with the spot-formed spacing members on adjacent discs being displaced in relation to each other.

As an example, a spot-formed and spacing member of one disc may be displaced in relation to a corresponding spot-formed spacing member of an adjacent disc a circumferential distance and/or a radial distance that is between 2-15 mm, such as between 3-10 mm, such as about 5 mm.

As an example, a spot-formed spacing member of one disc may be displaced in relation to a corresponding spot-formed spacing member of an adjacent disc a circumferential distance that is about half of the mutual distance between spot-formed spacing members of the disc.

Furthermore, displacement of spot-formed spacing members may also be achieved by using separation discs having different patterns of spot-formed-spacing members so that the spot-formed spacing members of a disc are not axially aligned with the spot-formed spacing members of an adjacent disc when the discs are stacked on top of each other, such as stacked onto a distributor.

As an example, all spot-formed spacing members of a disc may be displaced compared to the spot-formed spacing members of an adjacent disc.

A stack in which the spot-formed spacing members are displaced, i.e. in which the spot-formed spacing members are not axially aligned on top of each other, is advantageous in that it may provide better support for thin discs, i.e. the thin discs in a stack have more points of support compared to if the discs are arranged so that the spot-formed spacing members are aligned on top of each other in the disc stack. Thus, a stack in which the spacing members are displaced facilitates the use of thin discs in the stack.

Furthermore, a stack in which the spot-formed spacing members are displaced may be advantageous in that it allows for easy manufacturing or assembly of the disc stack, i.e. the spot-formed spacing members allows even interspaces between discs in the stack even if the spot-formed spacing members are not axially aligned. In other words, in a disc stack, the spot-formed spacing members have the ability to bear the large compression forces in a compressed stack without having to be aligned on top of each other. This is thus different from the conventional idea of forming a disc stack, in which conventional elongated spacing members on the discs are axially aligned on top of each other in mutually adjacent separation discs throughout the stack of separation discs, or in other words the spacing elements are in the prior art arranged in axially straight lines throughout the stack of separation discs, in order to bear all the compression forces in the compressed stack.

However, the discs in the stack may also be arranged so that the spot-formed spacing members are axially aligned. Thus, in embodiments of the first aspect of the invention, the discs having spot-formed spacing members are arranged so that a majority of said spot-formed spacing members of a disc are axially aligned with the spot-formed spacing members of an adjacent disc.

The stack of separation discs may be aligned on an aligning member, such as a distributor on a distributor. Thus, in embodiments of the first aspect of the invention, the stack further comprises a distributor onto which the separation discs are aligned to form a stack.

The stack of separation discs may further also be adapted to be compressed with a force that is above 8 tons.

In embodiments of the first aspect of the invention, the stack of separation discs according further comprises at least one axial rising channel formed by at least one through hole in said truncated surface or formed by at least one cut-out at the outer periphery of said truncated conical surface the of separation discs in the stack.

Axial rising channels may facilitate feeding and distributing fluid mixture, such as a liquid, into the interspaces in a stack of separation discs.

The stack of separation discs may comprise more than 4, such as more than five, such as more than six, axial rising channels.

Furthermore, the set of discs having spot-formed spacing members, and all separation discs of the disc stack, may have have a thickness that is less than 0.60 mm, such as less than 0.50 mm, such as less than 0.45 mm, such as less than 0.40 mm, such as less than 0.35 mm, such as less than 0.30 mm.

In embodiments of the first aspect of the invention, said spot-formed spacing members extend from said surface of the separation disc in a direction that forms an angle with the surface which is less than 90 degrees.

Thus, the spot-formed spacing member does not have to extend perpendicular from the surface. The direction in which the spot-formed spacing members extend may be defined as the direction from the base to the middle of the portion of the spot-formed spacing member extending furthest from the base, i.e. the direction of the axis passing through the middle portion of the base to middle of the portion extending furthest from the base. Thus, the spot-formed spacing members may extend from said surface of the separation disc in a direction that forms an angle with the surface which is less than 90 degrees, thus forming an extension direction of the spacing member from the surface that may be more aligned with the direction of the cone axis of the truncated conical shape of the separation disc. This is advantageous in that the spot-formed spacing members may better adhere to the surface of an adjacent disc in the stack of discs and the spacing member may better withstand the large axial compression forces encountered in a compressed disc stack, i.e. there may be a decreased risk of the spacing member deforming when compressing the stack of separation discs. The direction in which the spacing member extends may thus be a direction against the outer periphery of the disc, if the tip is arranged on the inner surface of the disc, and the direction in which the tip extends may be a direction against the inner periphery of the disc, if the tip is arranged on the outer surface of the disc.

Further, the spot-formed spacing members may extend from said surface of the separation disc in substantially the axial direction of the truncated conical shape of said separation disc.

Since the discs are aligned axially, a spot-formed spacing member extending axially will better adhere to an adjacent disc in the stack, thereby further decreasing the risk for unevenly sized interspaces between the discs as the stack is compressed. Further, spacing members extending axially may better withstand the axial compression forces encountered in a compressed disc stack.

However, the spot-formed spacing members may also extend from said surface of the separation disc in a direction that is substantially perpendicular to the surface of the separation disc.

In embodiments of the first aspect of the invention, a majority of the spot-formed spacing members are distributed on the surface of the separation disc at a mutual distance which is less than 20 mm.

As an example, the spot-formed spacing members may be distributed on the surface of the separation disc at a mutual distance which is less than 15 mm, such as about or less than 10 mm.

The spot-formed-spacing members may be evenly distributed on the surface, distributed in clusters, or distributed on the surface at different mutual distance, e.g. to form areas of the disc in which the density of spot-formed spacing members is higher compared to the density of spot-formed spacing members on the rest of the same surface of the disc.

In embodiments of the first aspect of the invention, said spot-formed spacing members extend to a height that is less than 0.8 mm from said surface of the separation disc.

As an example, the spot-formed spacing members may extend to a height that is less than 0.60, such as less than 0.50 mm, such as less than 0.40 mm, such as less than 0.30 mm, such as less than 0.25 mm, such as less than 0.20 mm, from said surface of the separation disc. According to some embodiments, the spot-formed spacing members may extend to a height within a range of 0.3-0.1 mm, or 0.25-0.15 mm from said surface of the separation disc. Since the separation disc has the form of a truncated cone, the height of the spot-formed spacing member over the truncated surface may be different than the actual axial interspace between discs in a stack of separation discs.

In embodiments of the first aspect of the invention, the spot-formed spacing members are distributed on the surface so that the surface density of spot-formed spacing members is higher at the outer periphery of the separation disc than on the rest of the disc.

This may decrease the risk of unevenly sized interspaces forming between the discs as the stack is compressed since the compression may be greater at the outer periphery of a disc. This is so because the compression may be greater at the outer periphery of a disc, and/or stress within a disc may manifest itself at the outer periphery of the disc. A higher density of the spot-formed spacing members may thus aid in keeping the appropriate interspace distance at the periphery of the disc. In more detail, when separation discs are compressed in a stack, the abutment between the discs at the spot-formed spacing members together with the disc material in between the spot-formed spacing members securely position the separation discs in relation to each other, with equidistant interspaces between the separation discs over the area covered by the respective separation discs. However, at the outer periphery of the separation discs, the disc material between the spot-formed spacing members of each separation disc forms a free end, and thus, is not secured in the same manner as farther in on the disc. Such a free end may require the higher density of the spot-formed spacing members in order to provide equidistant interspaces between the separation discs also at the peripheries of the discs.

For example, the spot-formed spacing members may be distributed with twice the density at the outer periphery of the disc as compared to the density of spot-formed spacing members on the rest of the disc. The outer periphery of the disc may be the disc surface area forming the outer 10-20 mm of the disc. In larger diameter separation discs, the outer periphery of the disc may be the disc surface area forming the outer 20-100 mm of the disc.

According to some embodiments the density of the spot-formed spacing members on the surface of a separation disc may increase from a radially inner portion of the separation disc to a radially outer portion of the separation disc. The increase may be gradual, from a low density of spot-formed spacing members at the radially inner portion of the separation disc to a high density of spot-formed spacing members at the radially outer portion of the separation disc. Alternatively, the increase may be provided in discrete steps, such that a low density of spot-formed spacing members is provided over an area at the radially inner portion of the separation disc, radially outside of the inner portion a higher density of spot-formed spacing members provided over an area, and so on to a highest density of spot-formed spacing members is provided over an area at the radially outer portion of the separation disc. For instance, the density may be increased in 2, 3, 2-4, or 3-6 discrete steps from the radially inner portion to the radially outer portion of the separation disc, e.g. depending on the diameter of the separation disc.

In embodiments of the first aspect of the invention, the spot-formed spacing members are provided on the inner surface of the separation disc.

For example, a majority of the spot-formed spacing members may be provided on the inner surface of the separation disc. Further, the spot-formed spacing members may be provided solely on the inner surface of the separation disc, meaning that the outer surface may be free of spot-formed spacing members, and optionally, the inner and/or outer surface may also be free of spacing members other than the spot-formed spacing members.

Furthermore, the spot-formed spacing members may be provided on the outer surface of the separation disc.

For example, a majority of the spot-formed spacing members may be provided on the outer surface of the separation disc. Further, the spot-formed spacing members may be provided solely on the outer surface of the separation disc, meaning that the inner surface may be free of spot-formed spacing members, and optionally, the inner and/or outer surface may also be free of spacing members other than the spot-formed spacing members.

Consequently, in embodiments, the spot-formed spacing members are provided solely on either the inner or the outer surface of the separation disc.

In embodiments of the first aspect of the invention, the spot-formed spacing members are integrally formed in one piece with the material of the separation disc.

Thus, the spot-formed spacing members may be formed in the material of the separation disc in accordance with known techniques for manufacturing separation discs with integrally formed spacing members, such as the method disclosed in U.S. Pat. No. 6,526,794. The spacing members may be integrally formed in a metal disc by means of so called flow-forming, or they may alternatively be provided by means of any suitable press method—such as the method disclosed in WO2010039097 A1.

A plastic separation disc comprising spot-formed spacing members that are integrally formed in one piece with the material may be provided by means of e.g. injection molding.

In embodiments of the first aspect of the invention, the spot-formed spacing members are integrally formed in one piece with the material of the separation disc so that the surface of the separation disc back or behind of a spot-formed spacing member is flat or smooth, or at least forms a dent that is less than the height of a spacing member. Thus, if a spot-formed spacing member is formed on the inner surface of the separation disc, the outer surface of the separation disc behind the spot-formed spacing member may be more or less flat.

The thickness of the separation discs may be less than 0.8 mm, such as less than 0.6 mm. However, it may be advantageous to use thin separation discs in order to be able to stack as many discs as possible within a given height and thereby increase the overall separation area. Thus, in embodiments of the first aspect of the invention, at least one separation disc, such as all separation discs in said set of separation discs comprising spot-formed spacing members has a thickness that is less than 0.50 mm.

For example, the separation discs of the set of separation discs may have a thickness that is less than 0.40 mm, such as less than 0.35 mm, such as less than 0.30 mm.

For example, the set of separation discs may have a diameter that is more than 300 mm and a thickness that is less than 0.40 mm, such as less than 0.30 mm.

As a further example, the set of separation discs may have a diameter that is more than 350 mm and a thickness that is less than 0.40 mm, such as less than 0.30 mm.

As a further example, the set of separation discs may have a diameter that is more than 400 mm and a thickness that is less than 0.40 mm, such as less than 0.30 mm.

As a further example, the set of separation discs may have a diameter that is more than 450 mm and a thickness that is less than 0.40 mm, such as less than 0.30 mm.

As a further example, the set of separation discs may have a diameter that is more than 500 mm and a thickness that is less than 0.40 mm, such as less than 0.30 mm.

As a further example, the set of separation discs may have a diameter that is more than 530 mm and a thickness that is less than 0.40 mm, such as less than 0.30 mm.

As an example, all discs of the stack and or the set of separation discs may have the same diameter and/or thickness.

In embodiments of the first aspect of the invention, said plurality of spot-formed spacing members comprises spot-formed spacing members having spherical or cylindrical shape as seen in the direction of their height.

In embodiments of the first aspect of the invention, said plurality of spot-formed spacing members comprises spot-formed spacing members that are tip-shaped and taper from the base at the surface of the separation disc towards a tip extending a certain height from said surface.

The spot-formed spacing members may be tip-shaped and may thus taper from the base at the surface towards a tip, which extends a certain height from the surface. The height of a tip-shaped spacing member is the height perpendicular to the surface.

The spot-formed spacing members may e.g. have the form of a cone, i.e. be cone-shaped, or the form of a pyramid, depending on the form of the base along the surface. The base at the surface may thus have the form as a cross, a circle, an ellipse, a square or have a rectangular shape.

The plurality of spot-formed spacing members may have a tip-shaped cross-section that tapers from a base at the surface of the separation disc towards a tip extending a height from said surface.

The spot-formed spacing members may be tip-shaped in at least one cross-section, such as the cross-section perpendicular to the radius of the disc. Thus, the spot-formed spacing members may form small ridges that extend on the surface. The ridges may for example extend in a radial direction of the separation disc, i.e. substantially along a direction of flow of fluid mixture along the separation disc.

The spot-formed spacing members may be tip-shaped in more than one cross-section.

The spot-formed spacing members may be tip-shaped as a whole. i.e. each cross section of a spot-formed spacing member is tip-shaped.

As an example, the tip-shaped spacing members may have the form of a cone or a pyramid, i.e. have a geometric shape that tapers smoothly from the flat base at the surface to the tip, i.e. to an apex a certain height above the base. The apex may be directly above the centroid of the base. However, the apex may also be located at a point that is not above the centroid so that the tip-shaped spacing members have the form of an oblique cone or an oblique pyramid.

If spot-formed spacing members are introduced on the surfaces of the thin metal separation discs, then equidistant spaces in a stack comprising thin separation discs may be achieved. Hence, the separating capacity of the centrifugal separator can in this way be further increased by fitting a greater number of the thinner metal separation discs into the stack. The invention will in this way facilitate the use of separation discs as thin as possible to maximize the number of separation discs and interspaces within a given stack height. Furthermore, the spot-formed spacing members lead to less contact area between a spacing member of a disc and an adjacent disc, thus leading to a larger surface area of the discs in a stack being available for separation. Further, a small contact area decreases the risk of dirt or impurities being stuck within a disc stack during operation of a centrifugal separator. Also, the equidistant spaces in between the separation discs contribute to decreasing the risk of dirt or impurities being stuck within the disc stack during operation of the centrifugal separator. Moreover, the equidistant spaces provide for improved separation performance in the centrifugal separator. Since the interspaces formed between the separation discs are equidistant, the separation performance is substantially the same all over the separation area formed within the disc stack, and thus, closer to a theoretically calculated separation performance of the relevant centrifugal separator. Whereas in a prior art disc stack, wherein the separation discs are deformed during operation of the centrifugal separator and thus, form uneven interspaces between the discs, the separation performance varies within the disc stack, and therefore, is farther from the theoretically calculated separation performance of the relevant centrifugal separator.

As an example, the tip-shaped and spot-formed spacing members may extend from said surface of the separation disc in a direction that forms an angle with the surface which is less than 90 degrees.

Furthermore, the tip-shaped and spot-formed spacing members may extend from said surface of the separation disc in substantially the axial direction of the truncated conical shape of said separation disc.

Moreover, the tip of said spot-formed spacing members may have a tip radius which is less than the height to which said spot-formed spacing members extend from the surface.

As an example, the tip of said spot-formed spacing members may have a tip radius seen in a cross-section of the spot-formed spacing member which is less than half the height, such as less than a quarter of the height, such as less than a tenth of the height, to which said spot-formed spacing members extend from the surface. With such a "sharp" tip, the spot-formed spacing member may more easily adhere to the surface of an adjacent disc in a disc stack, and a sharp tip also decreases blockage or obstruction of the flow of fluid mixture between the discs in a stack of separation discs.

The plurality of separation discs comprising spot-formed spacing members may comprise spacing members having different shape. Thus, a single disc may comprise spot-formed spacing members having different shapes, and the plurality of discs may comprise different discs having spot-formed spacing members of different shapes, i.e. some discs may have only spherical spot-formed spacing members whereas some discs may have only tip-shaped spot-formed spacing members.

However, the plurality of discs comprising spot-formed spacing members may also comprise separation discs having the same type of spot-formed spacing members.

In embodiments of the first aspect of the invention, a majority of the plurality of discs comprising spot-formed spacing members are of the same kind in terms of thickness, diameter, shape and number of spot-formed spacing members.

In embodiments of the first aspect of the invention, the plurality of discs comprising spot-formed spacing members are all of the same kind in terms of thickness, diameter, shape and number of spot-formed spacing members.

As a second aspect of the invention there is provided a method for separating at least two components of a fluid mixture which are of different densities comprising the steps of:

providing a centrifugal separator according to any one of aspects and/or embodiments discussed herein.

supplying said fluid mixture which are of different densities via said separator inlet to said separation space;

discharging a first separated phase from said separation space via said first separator outlet; and discharging a second separated phase from said separation space via said second separator outlet.

The terms and definitions used in relation to the second aspect are the same as discussed in relation to the first aspect above.

In embodiments of the second aspect of the invention, the step of supplying comprises supplying said fluid mixture at a flow rate which is above 60 m³/h, such as above 70 m³/h.

In embodiments of the second aspect of the invention, the fluid mixture to be separated comprises milk and said first separated phase comprises a cream phase and said second separated phase comprises a skimmed milk phase.

As an example, the method may comprise supplying said fluid mixture at a flow rate which is above 60 m³/h, such as above 70 m³/h, and discharging separated phases so that the concentration of cream in the skim milk is less than 0.02%, such as less than 0.01%.

BRIEF DESCRIPTION OF THE DRAWINGS

FIGS. 1a-c shows an embodiment of a separation disc.

FIGS. 5a-c show an embodiment of a disc stack in which the spot-formed spacing members of a separation disc are displaced in relation to the spot-formed spacing members of an adjacent disc. FIG. 5b is a radial section and FIG. 5c is a close up-view of the inner surface FIGS. 6a and b shows an embodiment of a disc stack in which the spot-formed spacing members of a separation disc are axially aligned with the spot-formed spacing members of an adjacent disc.

DETAILED DESCRIPTION

A stack of separation discs, examples of separation discs that may be used in the stack as well as a centrifugal separator according to the present disclosure will be further illustrated by the following description with reference to the accompanying drawings.

Figure 1A:
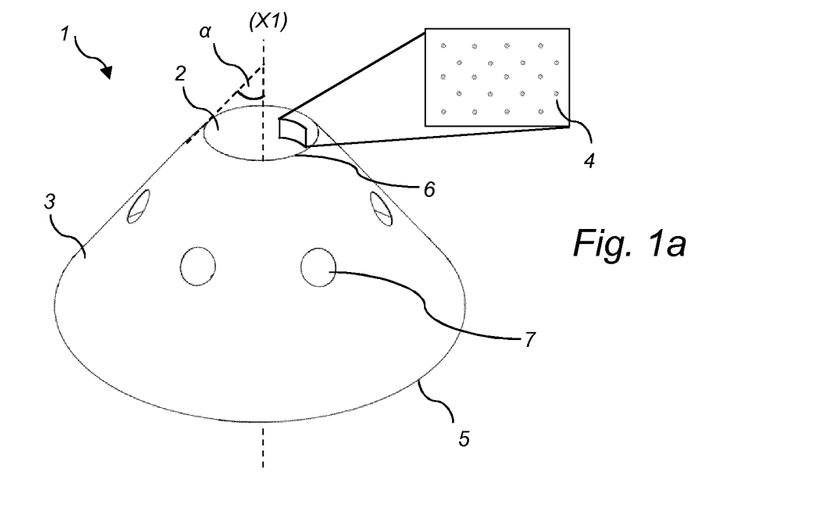
FIG. 1a is a perspective view.
Figure 1B:
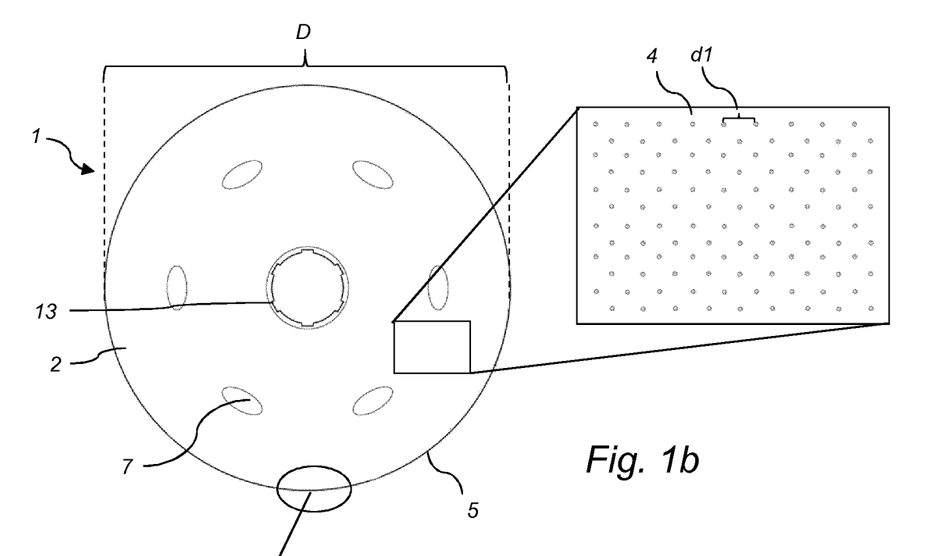
FIG. 1b is a view from the bottom, i.e. showing the inner surface of the separation disc.
Figure 1C:
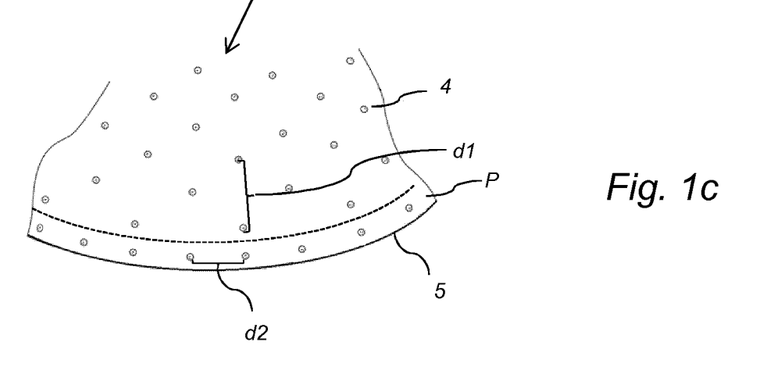
FIG. 1c is a close-up view of the outer periphery of the inner surface.

FIGS. 1a-c show schematic drawings of an embodiment of a separation disc. FIG. 1a is a perspective view of a separation disc 1 according to an embodiment of the present disclosure. The separation disc 1 has a truncated conical shape, i.e. a frusto-conical shape, along conical axis X1. Axis X1 is thus the direction of the axis passing through the apex of the corresponding conical shape. The conical surface forms cone angle α with conical axis X1. The separation disc has an inner surface 2 and an outer surface 3, extending radially from an inner periphery 6 to an outer periphery 5. In this embodiment, the separation disc is also provided with a number of through holes 7, located at a radial distance from both the inner and outer peripheries. When forming a stack with other separation discs of the same kind, through holes 7 may thus form axial distribution channels for e.g. liquid mixture to be separated that facilitates even distribution of the liquid mixture throughout a stack of separation discs. The separation disc further comprises a plurality of spot-formed spacing members 4 extending above the inner surface of the separation disc 1. These spacing members 4 provide interspaces between mutually adjacent separation discs in a stack of separation discs. Examples of spot-formed spacing members are shown in more detail in FIGS. 2a-2f. As seen in FIG. 1a, only the inner surface 2 is provided with spot-formed spacing members 4, whereas outer surface 3 is free of spot-formed spacing members 4 and also free of other spacing members. Inner surface 2 is also free of other spacing members than the spot-formed spacing members 4. Thus, in a stack of separation discs 1 of the same kind, spot-formed spacing members 4 are the only spacing members, i.e. the only members that form the interspaces and axial distances between discs in the stack. The spot-formed spacing members are thus the only load-bearing element on the disc 1 when discs are axially stacked on top of each other. This is thus a difference from a conventional separation disc, in which a few elongated, radially extending spacing members on each disc form the interspaces and bear the compression forces in a disc stack.

However, as an alternative, it is to be understood that outer surface 3 could be provided with the spot-formed spacing members 4 whereas inner surface 2 could be free of spot-formed spacing members 4 and also free of other spacing members.

FIG. 1b shows the inner surface 2 of the separation disc 1. The diameter D of the disc is in this embodiment about 530 mm, and the spot-formed spacing members 4 extends from a base at the inner surface 2 that has a width that is less than 1.5 mm along the inner surface 2 of the separation disc 1. Furthermore, the mutual distance d1 between the spot-formed spacing members 4 is about 10 mm, and the whole inner surface 2 comprises more than 4000 spot-formed spacing members 4.

There are also a number of cut-outs 13 at the inner periphery 6 of the separation disc 1 in order to facilitate stacking on e.g. a distributor.

FIG. 1c shows a close-up view of the outer periphery 5 of the inner surface 2 of the separation disc 1. In this embodiment, the density of spot-formed spacing members 4 is higher at the outer periphery than on the rest of the disc. This is achieved by having more spot-formed spacing members arranged in an outer peripheral zone P, so that the distance d2 between the radially outermost spacing members 4 within the outer peripheral zone P is less than the distance d1 between spacing members 4 outside this zone. The peripheral zone P may for example extend 10 mm radially from the outer periphery 5. A higher density of spacing members at the outermost periphery is advantageous in that it decreases the risk for mutually adjacent discs in a disc stack touching each other at the outermost periphery where the compression and centrifugal forces are high. Mutually adjacent discs touching each other will block the interspace and thus lead to a decreased efficiency of the disc stack.

Figure 2A:
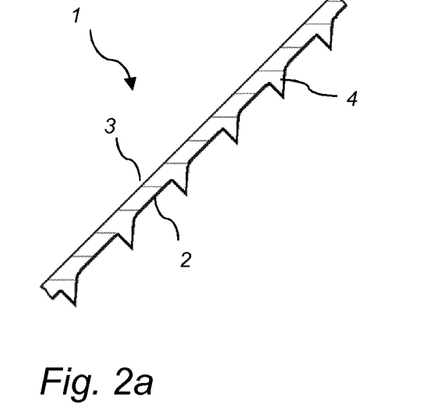
FIGS. 2a-f show embodiments of different spot-formed spacing members.
Figure 2B:
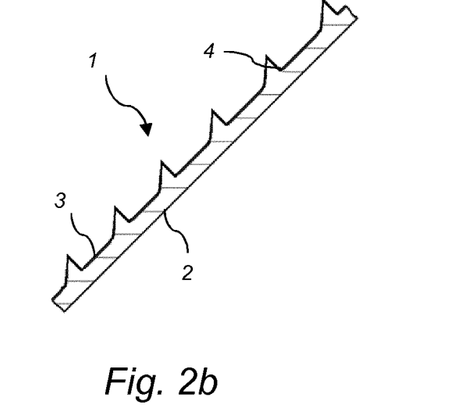

FIGS. 2a-f show embodiments of different types of spot-formed spacing members that may be used in the disc stack of the present disclosure. FIG. 2a shows a section of a part of a separation disc 1 in which the spot-formed spacing members 4 are arranged in a line extending in the radial direction on the inner surface 2 of the disc 1. Outer surface 3 is free of any kind of spacing member. The spacing members 4 are integrally formed in the separation disc 1, i.e. formed in one piece with the material of the separation disc itself. The spacing members 4 are tip-shaped and taper from the surface to a tip that extends a certain distance or height from the inner surface 2. FIG. 2b shows a similar section as the disc of FIG. 2a, but in this example the tip-shaped and spot-formed spacing members are only provided on the outer surface 3, whereas inner surface 2 is free of spot-formed spacing members.

Figure 2C:
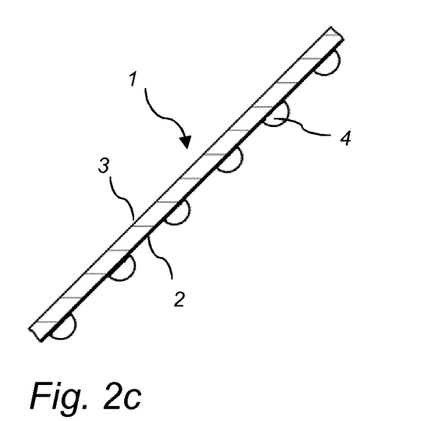
Figure 2D:
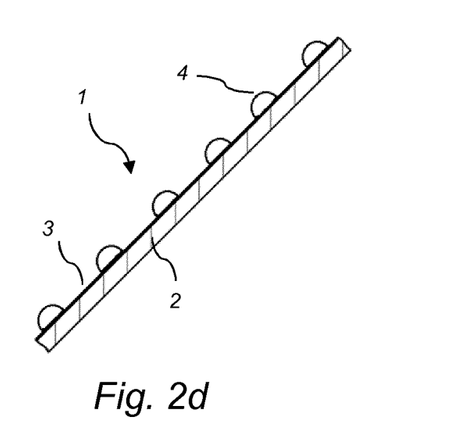

FIG. 2c also shows a section of a part of another example of a separation disc 1 in which the spot-formed spacing members 4 are arranged in a line extending in the radial direction on the inner surface 2 of the disc 1 whereas outer surface 3 is free of any kind of spacing member. The spacing members 4 are in this example shaped as half-spheres that protrude from the inner surface 2. FIG. 2d shows a similar section as the disc of FIG. 2c, but in this example the half-spherical and spot-formed spacing members are only provided on the outer surface 3, whereas inner surface 2 is free of spot-formed spacing members.

Figure 2E:
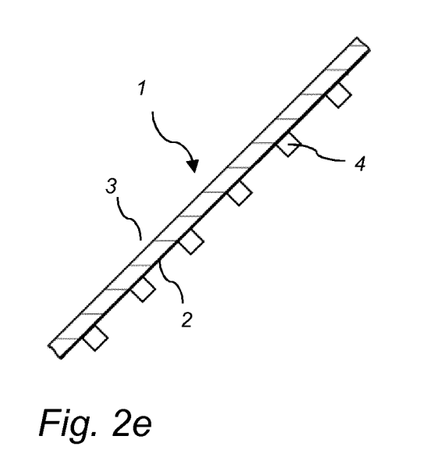
Figure 2F:
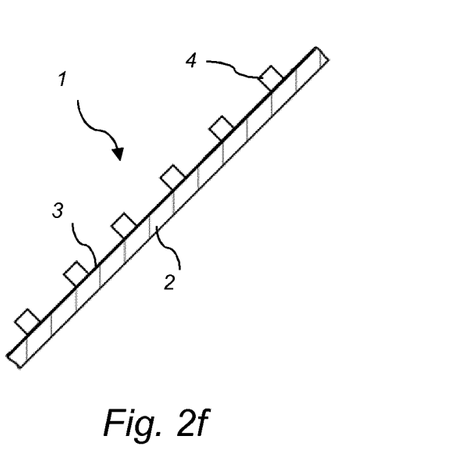

FIG. 2e also shows a section of a part of another example of a separation disc 1 in which the spot-formed spacing members 4 are arranged in a line extending in the radial direction on the inner surface 2 of the disc 1 whereas outer surface 3 is free of any kind of spacing member. The spacing members 4 are in this example shaped as cylinders that protrude from the inner surface 2. FIG. 2f shows a similar section as the disc of FIG. 2e, but in this example the cylindrical and spot-formed spacing members are only provided on the outer surface 3, whereas inner surface 2 is free of spot-formed spacing members.

Figure 3A:
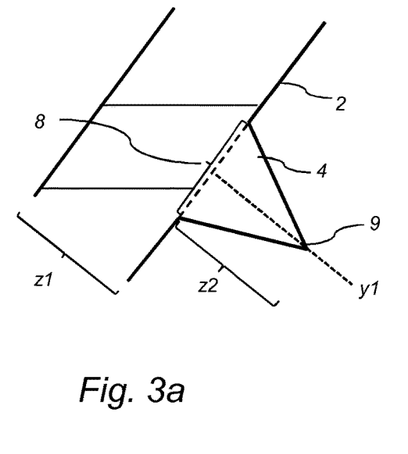
FIGS. 3a-e show embodiments of different tip-shaped and spot-formed spacing members.

FIGS. 3a-e show embodiments of different tip-shaped and spot-formed spacing members. FIG. 3a shows a close-up view of an embodiment of a tip-shaped spacing member 4. The tip-shaped spacing member 4 extends from a base 8 on the inner surface 2. This base 8 extends to a width that is less than 1.5 mm along the inner surface 2 of the separation disc 1. The tip-shaped spacing member tapers from the base 8 to a tip 9 located a distance z2 from the base. Thus, the height of the tip-shaped spacing member is distance z2, which in this case is between 0.15 and 0.30 mm, whereas the thickness of the separation disc, as illustrated by distance z1 in FIG. 2b, is between 0.30 and 0.40 mm. In the example of FIG. 3a, the tip-shaped spacing member 4 extends from base 8 in the direction y1 that is substantially perpendicular to the inner surface 2. Direction y1 is thus parallel to the normal N of the inner surface 2.

Figure 3B:
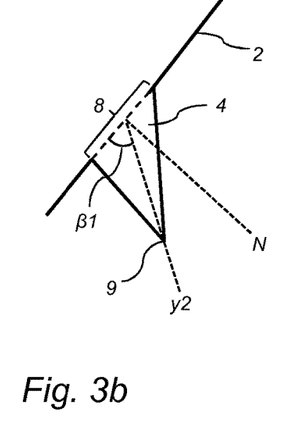

FIG. 3b shows an example of a tip-shaped spacing member 4 that extends from the surface of the separation disc in a direction that forms an angle with the surface which is less than 90 degrees. The spacing member 4 of FIG. 3b is the same as the spacing member shown in FIG. 3a, but with the difference that it extends in a direction y2 that forms an angle with the normal N of the inner surface. In this case, the tip-shaped spacing member 4 extends in a direction y2 that forms angle β1 with the inner surface 2, and angle β1 is less than 90 degrees. Thus, tip 9 extends from base 8 in direction y2 that forms an angle with the surface that is about 60-70°.

Figure 3C:
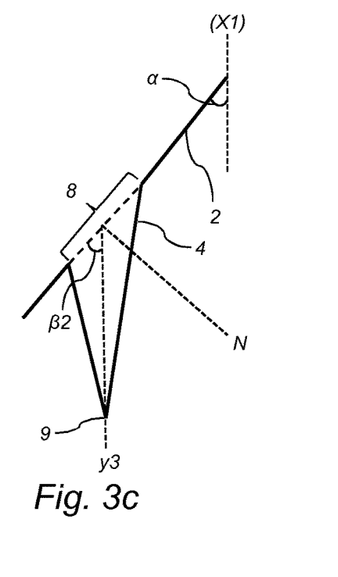

FIG. 3c shows a further example of a tip-shaped spacing member 4 that extend from the surface of the separation disc in a direction that forms an angle with the surface which is less than 90 degrees. The spacing member 4 of FIG. 3c is the same as the spacing member shown in FIG. 3b, but with the difference that it extends in a direction y3 that forms an angle β2 with the inner surface that is less that angle β1 in FIG. 3b. In this example, angle β2 is substantially the same as the alpha angle α of the separation disc 1, i.e. half of the opening angle of the corresponding conical shape of the separation disc. Angle α is thus the angle of the conical portion with conical axis X1 of the separation disc 1. Angle α may be about 35°. In other words, the tip-shaped spacing member 4 extend from the inner surface 2 of the separation disc 1 in substantially the axial direction of the truncated conical shape of said separation disc 1. Thus, in a formed stack of separation discs, a spot-formed spacing member extending substantially axially may better adhere to an adjacent disc in the stack, thereby further decreasing the risk for unevenly sized interspaces between the discs as the stack is compressed.

It is to be understood that a majority or all spot-formed spacing members 4 on a separation disc may extend in the same direction, i.e. a majority or all spot-formed spacing members 4 on a separation disc may extend in a direction that is substantially perpendicular to the surface or a majority or all spot-formed and tip-shaped spacing members 4 on a separation disc may extend in a direction that forms an angle with the surface, i.e. like the examples shown in like the example shown in FIGS. 2c-f and FIG. 3a.

Figure 3D:
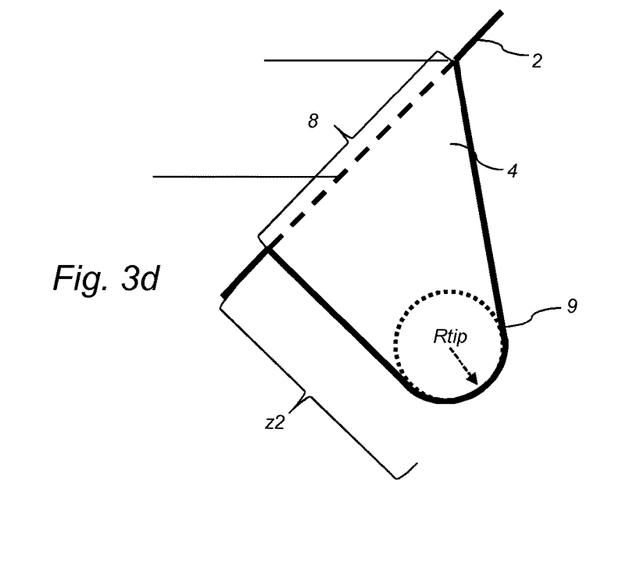

Furthermore, the tip 9 of a tip-shaped and spot-formed spacing member has a tip radius $R_{tip}$, and is further shown in more detail in FIG. 3d. This tip radius $R_{tip}$ is small in order to get as sharp tip as possible. As an example, tip radius $R_{tip}$ may be less than the height z2 to which the spot-formed spacing member 4 extend from the inner surface 2. Further, tip radius $R_{tip}$ may be less than half the height z2, such as less than a tenth of the height z2.

Figure 3E:
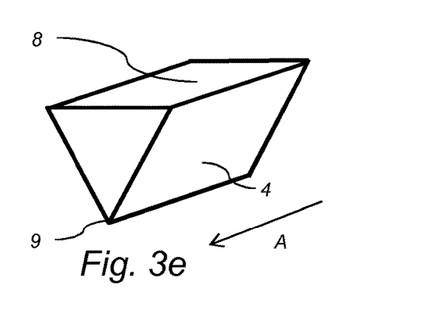

FIG. 3e shows an example of a spot-formed spacing member 4 that is tip-shaped in at least one cross-section and has a longitudinal extension in one direction. The spacing member 4 thus forms a ridge on the surface of the separation disc that extends in a direction indicated by arrow A along the surface. The direction A may be the radial direction of the separation disc. The direction A may be along the direction of the flow on the separation disc when used in a centrifugal separator. The tip 9 of the spot-formed spacing member 4 may have a longitudinal extension along the direction A of substantially the same length as the base 8 of the spot-formed spacing member 4 arranged on the surface (not shown) of the separation disc. Alternatively, the tip 9 of the spot-formed spacing member 4 may have a longitudinal extension along the direction A, which is shorter than the length of the base 8 of the spot-formed spacing member 4 arranged on the surface (not shown) of the separation disc.

The dimensions as discussed above related to the width of the base 8 of the spot-formed spacing member 4, also apply to the width of the spot-formed spacing member 4 along the direction A in the embodiments of FIG. 2f. The width along direction A may be the same as, or differ from the distance across direction A. Thus, according to embodiments the width of the base 8 may be less than 5 mm along the surface of the separation disc. As an example, the base 8 of the spot-formed spacing member may extend to a width 8 which is less than 2 mm along the surface of the separation disc, such as to a width which is less than 1.5 mm along the surface of the separation disc, such as to a width which is about or less than 1 mm along the surface of the disc.

Figure 4:
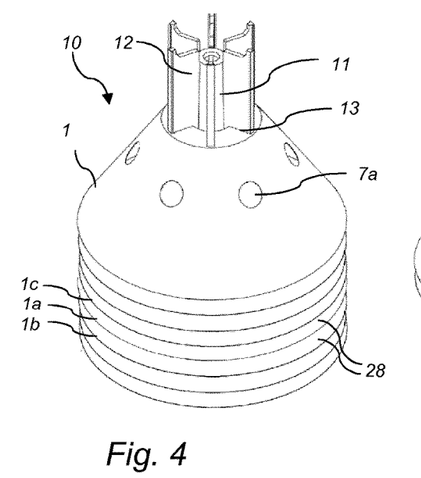
FIG. 4 shows an embodiment of a disc stack.

FIG. 4 shows an embodiment of a disc stack 10 that may be used in a centrifugal separator of the present disclosure. The disc stack 10 comprises separation discs 1 provided on a distributor 11. For clarity, FIG. 4 only shows a few separation discs 1, but it is to be understood that the disc stack 10 may comprise more than 200 separation discs 1, such as more than 300 separation discs. Due to the spot-formed spacing members, interspaces 28 are formed between stacked separation discs 1, i.e. interspace 28 is formed between a separation disc 1a and the adjacent separation discs 1b and 1c located below and above separation disc 1a, respectively. Through holes in the separation discs form axial rising channels 7a extending throughout the stack. Furthermore, the disc stack 10 may comprise a top disc (not shown), i.e. a disc arranged at the very top of the stack that is not provided with any through holes. Such a top disc is known in the art. The top disc may have a diameter that is larger than the other separation discs 1 in the disc stack in order to aid in guiding a separated phase out of a centrifugal separator. A top disc may further have a larger thickness as compared to the rest of the separation discs 1 of the disc stack 10. The separation discs 1 may be provided on the distributor 11 using cut outs 13 at the inner periphery 5 of the separation discs 10 that are fitted in corresponding wings 12 of the distributor.

Figure 5A:
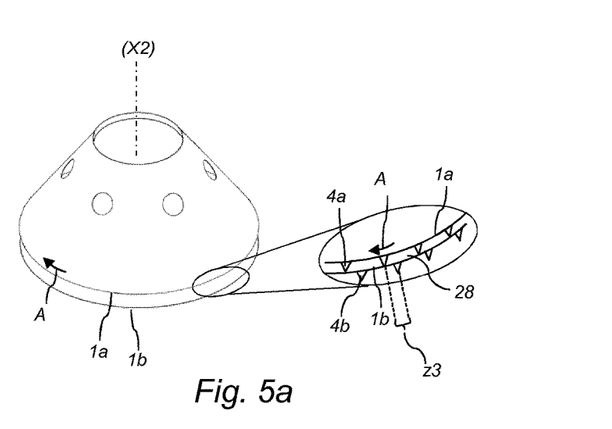
FIG. 5a is a perspective view.
Figure 5B:
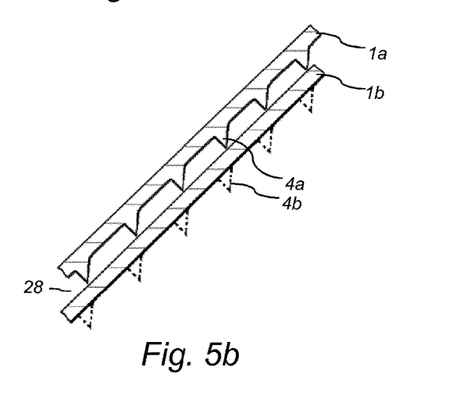
Figure 5C:
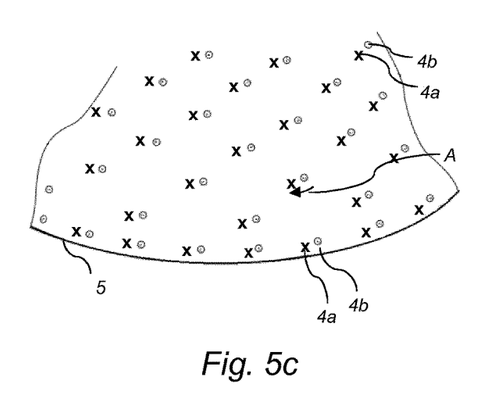

FIGS. 5a-c shows an embodiment in which the separation discs 1 are axially arranged in the stack 10 so that a majority of the spot-formed spacing members 4a of a disc 1a are displaced compared to the spot-formed and spacing members 4b of an adjacent disc 1b. In this embodiment, this is performed by a small rotation in the circumferential direction of disc 1a as compared to adjacent disc 1b, as illustrated by arrow "A" in FIGS. 5a and 5c. Thus, as seen in FIG. 5a, adjacent separation discs 1a and 1b are axially aligned along rotational axis X2, which is the same direction as conical axis X1 as seen in FIGS. 1 and 2, but due to the arrangement of the spot-formed spacing members, a spot-formed spacing member 4a of separation disc 1a is not axially aligned over corresponding spot-formed spacing member 4b of separation disc 1b. As an example, the discs 1a and 1b are arranged so that a spot-formed spacing member 4a of disc 1a is displaced a circumferential distance z3 in relation to corresponding spot-formed spacing member 4b of disc 1b. Distance z3 may be about half the distance of the mutual distance between spot-formed spacing members on a disc, such as between 2-10 mm.

In other words, the separation discs of the disc stack 1 are arranged so that a spot-formed and spacing member 4a of a separation disc 1a does not abut adjacent disc 1b at a position where the adjacent disc 1b has spot-formed spacing member 4b. This is also illustrated in FIG. 5b, which shows a section of adjacent discs 1a and 1 b. The spot-formed spacing members 4a of disc 1a and the spot-formed spacing members 4b of disc 1b may be provided at the same radial distance, but are shifted in the circumferential direction. Furthermore, FIG. 5c shows a close-up view of the outer periphery 5 of disc 1b. The spot-formed members 4a of adjacent disc 1a abut separation disc 1b at positions indicated by crosses in FIG. 5c, which are positions that are shifted in the circumferential direction as compared to the positions of the spot-formed spacing members 4b, as illustrated by arrow "A".

Figure 6A:
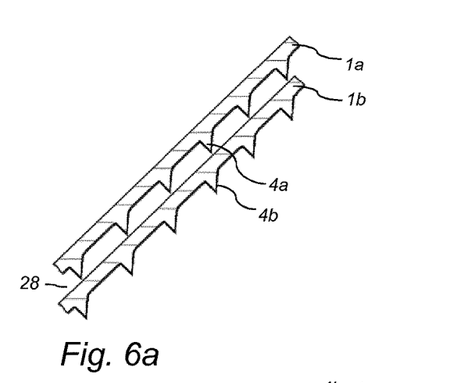
FIG. 6a is a radial section and FIG. 6b is a close up-view of the inner surface.
Figure 6B:
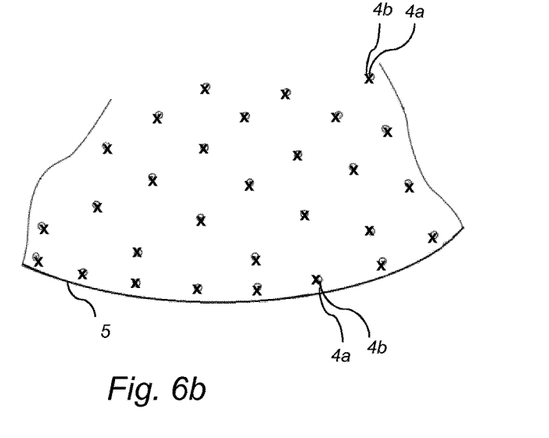

However, the separation discs 1 of the disc stack 10 may be provided on the distributor 11 so that a majority of the spot-formed and tip-shaped spacing members of a disc are axially aligned with the spot-formed and tip-shaped spacing members of an adjacent disc, as in a conventional disc stack having elongated radial spacing members. This is illustrated in FIGS. 6a and 6b, in which adjacent separation discs 1a and 1b are provided so that the spot-formed spacing members 4a of disc 1a are aligned with the spot-formed and tip-shaped spacing members 4b of disc 1b. FIG. 6a, shows a section of adjacent discs 1a and 1b in which spacing members 4a and 4b are aligned, whereas FIG. 6b shows a close-up view of the outer periphery 5 of disc 1b. In contrast to the embodiment illustrated in FIG. 5c, the spot-formed and tip-shaped spacing members 4a of adjacent disc 1a actually abut separation disc 1b at the positions of the spot-formed and tip-shaped spacing members 4b of discs 1b, as indicated by the crosses in FIG. 6b.

Figure 7:
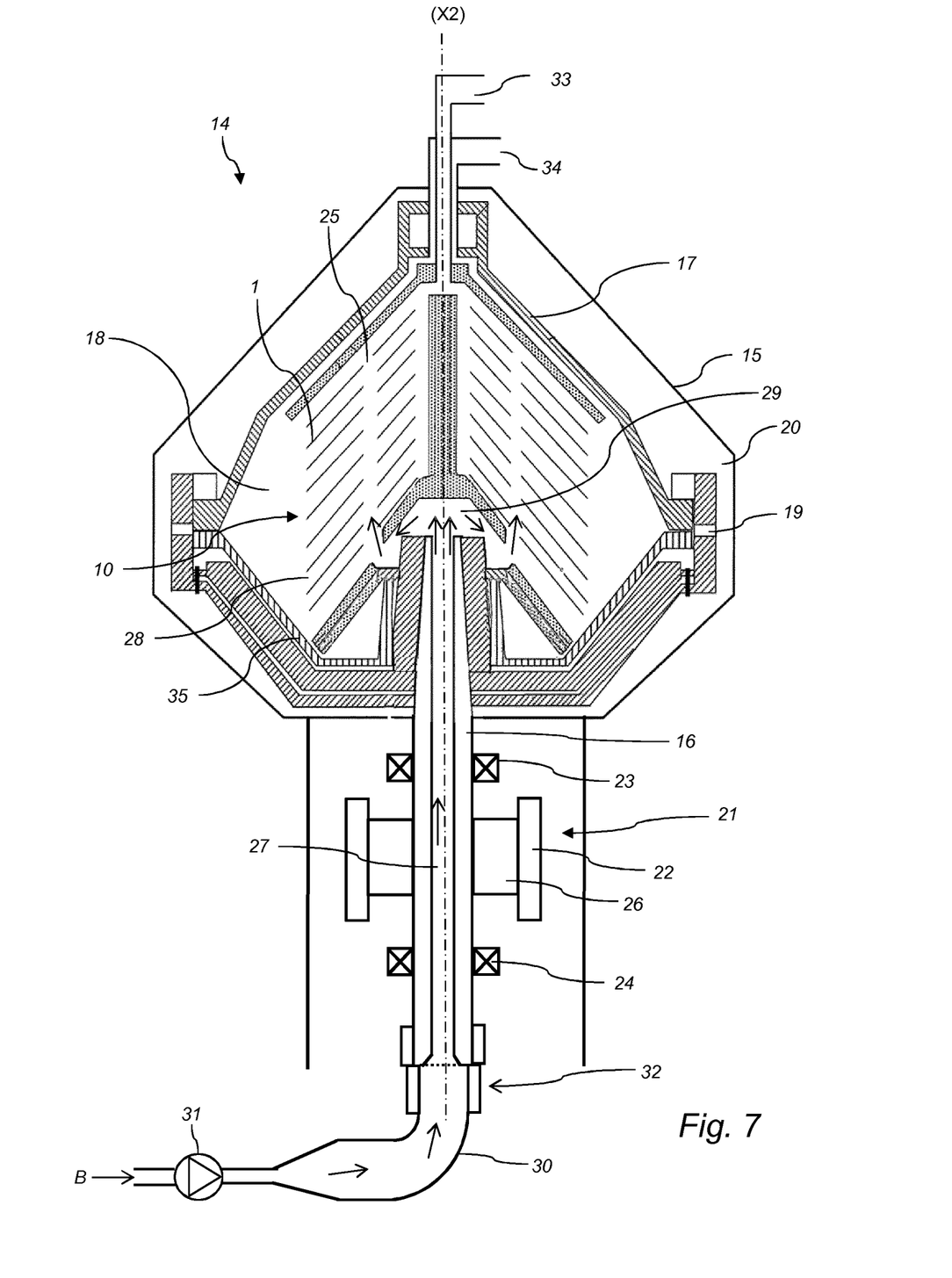
FIG. 7 shows a cross-section through a centrifugal separator.

FIG. 7 shows a schematic example of a centrifugal separator 14 according to an embodiment of the present disclosure, arranged to separate a liquid mixture into at least two phases. The separator of FIG. 7 is adapted to separate milk into a cream phase a skimmed milk phase. Further, it is to be understood that FIG. 7 is a schematic drawing and is thus not drawn into scale.

The centrifugal separator 14 comprises a rotating part arranged for rotation about an axis of rotation (X2) and comprises rotor 17 and spindle 16. The rotor 17 may also be referred to as a bowl, or separator bowl. The spindle 16 is supported in a stationary frame 15 of the centrifugal separator 14 in a bottom bearing 24 and a top bearing 23. The stationary frame 15 surrounds rotor 17.

The rotor 17 forms within itself a separation chamber 18 in which centrifugal separation of e.g. a liquid mixture to takes place during operation. That is, the rotor 17 encloses the separation chamber 18. The separation chamber 18 may also be referred to as a separation space 18.

The separation chamber 18 is provided with a stack 10 of frusto-conical separation discs 1 in order to achieve effective separation of the fluid to be separated in the interspaces 28 between the discs 1. The stack 10 of truncated conical separation discs 1 are examples of surface-enlarging inserts. These discs 1 are fitted centrally and coaxially with the rotor 17 and also comprise through holes which form axial channels 25 for axial flow of liquid when the separation discs 1 are fitted in the centrifugal separator 14. The separation discs 1 comprise spot-formed spacing members as discussed in the examples above, and are in this case fitted on the stack 10 so that that a majority of said spot-formed spacing members of a disc are displaced compared to the spot-formed spacing members of an adjacent disc In FIG. 7, only a few discs 1 are illustrated in the stack 10, and the stack comprises in this case more than 300 separation discs having spot-formed spacing members. The separation discs 1 have a diameter that is above 500 mm and each disc is provided with more than 4000 spot-formed spacing members integrally formed on the inner surface of each disc.

The rotor 17 has extending from it a liquid light phase outlet 33 for a lower density component separated from the liquid mixture, and a liquid heavy phase outlet 34 for a higher density component, or heavy phase, separated from the liquid mixture. The outlets 33 and 34 extend through the frame 15. The outlets 33, 34 may also be referred to as separator outlets 33, 34. In certain applications, the separator 14 only contains a single liquid outlet, such as only liquid outlet 33. This depends on the liquid material that is to be processed. The rotor 17 is further provided with a third outlet for discharge of sludge that has accumulated at the periphery of the separation chamber 18. The sludge outlet is in the form of a plurality of peripheral ports 19 that extend from the separation chamber 18 through the rotor casing to a surrounding space 20 outside the centrifuge rotor 17. The peripheral ports 19 may be intermittently openable during a short time period, e.g. in the order of milliseconds, and permit total or partial discharge of sludge from the separation space, using a conventional intermittent discharge system as known in the art.

The centrifugal separator 1 is further provided with a drive motor 21. This motor 21 may for example comprise a stationary element 22 and a rotatable element 26, which rotatable element surrounds and is connected to the spindle 16 such that it transmits driving torque to the spindle 16 and hence to the rotor 17 during operation. The drive motor 21 may be an electric motor. Alternatively, the drive motor may be connected to the spindle 16 by transmission means. The transmission means may be in the form of a worm gear which comprises a pinion and an element connected to the spindle 16 in order to receive driving torque. The transmission means may alternatively take the form of a propeller shaft, drive belts or the like, and the drive motor may alternatively be connected directly to the spindle.

A central duct 27 extends through the spindle 16, which takes the form of a hollow, tubular member. The central duct 27 forms in this embodiment an inlet duct for supplying the liquid mixture for centrifugal separation to the separation space 18 via an inlet 29 of the rotor 17. The inlet 29 may also be referred to as a separator inlet 29. Introducing the liquid material from the bottom provides a gentle acceleration of the liquid material. The spindle 16 is further connected to a stationary inlet pipe 30 at the bottom end of the spindle 16 such that liquid material to be separated may be transported to the central duct 27 by transporting means. Such transporting means may comprise at least one pump 31 arranged so as to enable supply of liquid material to be separated at a flow rate that is above 60 m3/h, such as above 70 m$^3$/hour, to the central duct 27 of the centrifugal separator 14.

A first mechanical hermetic seal 32 is arranged at the bottom end of the spindle 16 to seal the hollow spindle 16 to the stationary inlet pipe 30. The hermetic seal 32 is an annular seal that surrounds the bottom end of the spindle 16 and the stationary pipe 30. Further, also the liquid light phase outlet 33 and the liquid heavy phase outlet 34 may be hermetically mechanically sealed. As an alternative, centripetal pumps, such as paring discs, may be arranged at outlets 33 and 34 to aid in transporting separated phases out from the separator.

During operation of the separator in FIG. 7, the rotor 17 is caused to rotate by torque transmitted from the drive motor 21 to the spindle 16. Via the central duct 27 of the spindle 16, liquid material to be separated, such as milk, is brought into the disc stack 10 via inlet 29 and axial rising channels 25. In the hermetic type of inlet 29, the acceleration of the liquid material is initiated at a small radius and is gradually increased while the liquid leaves the inlet and enters the separation chamber 18 and disc stack 10. Further, as discussed above, the separator 14 may also have hermetic outlets and the separation chamber 18 may be intended to be completely filled with liquid during operation. In principle, this means that preferably no air or free liquid surfaces is meant to be present within the rotor 17. However, liquid may also be introduced when the rotor is already running at its operational speed. Liquid material may thus be continuously introduced into the rotor 17.

The path of the liquid material to be separated through the spindle 16 to the separation space 18 is illustrated by arrows "B" in FIG. 7.

Depending on the density, different phases in the liquid is separated in the interspaces 28 between the separation discs of the stack 10 fitted in the separation space 18. Heavier components in the liquid move radially outwards between the separation discs, whereas the phase of lowest density moves radially inwards between the separation discs and is forced through outlet 33 arranged at the radial innermost level in the separator. The liquid of higher density is instead forced out through outlet 34 that is at a radial distance that is larger than the radial level of outlet 33. Thus, during separation, an interphase between the liquid of lower density and the liquid of higher density is formed in the separation space 18. Solids, or sludge, accumulate at the periphery of the separation space 18 and may be emptied intermittently from the separation space by opening of sludge outlets, i.e. the peripheral ports 19, whereupon sludge and a certain amount of liquid is discharged from the separation space by means of centrifugal force. The opening and closing of the peripheral ports 19 are controlled by means of a sliding bowl bottom 35 which is movable between an open and closed position along a direction parallel to the axis of rotation (X2).

Thus, when separating milk, the skimmed milk phase is withdrawn via liquid heavy phase outlet 34 whereas the cream phase is withdrawn via liquid light phase outlet 33. Milk to be separated may further comprise a small amount of solids such as straw and hairs, udder cells, leucocytes, red blood cells and bacteria. Such solids thus collect in the periphery of the separation chamber 18 and are discharged via the sludge outlets 19.

In the embodiment of FIG. 7, the material to be separated is introduced via the central duct 27 of the spindle 16. However, the central duct 27 may also be used for withdrawing e.g. the liquid light phase and/or the liquid heavy phase. Thus, in embodiments, the central duct 27 comprises at least one additional duct, i.e. at least two ducts. In this way, the liquid mixture to be separated may be introduced to the rotor 17 via a central duct 27, and concurrently, the liquid light phase and/or the liquid heavy phase may be withdrawn through such an additional duct extending e.g. within the central duct 27 or surrounding central duct 27.

Figure 8:
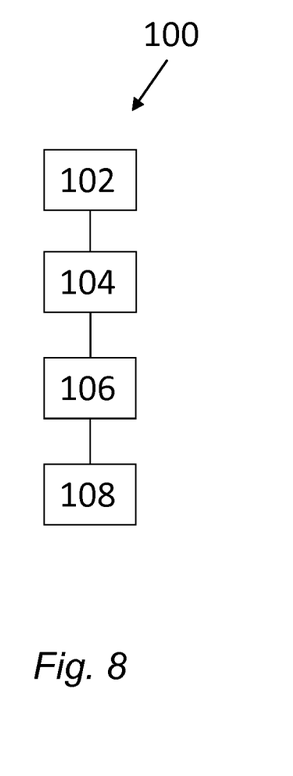
FIG. 8 illustrates a method for separating at least two components of a fluid mixture.

FIG. 8 illustrates a method 100 for separating at least two components of a fluid mixture which are of different densities comprising the steps of:
 providing 102 a centrifugal separator 14 according to any of aspects and/or embodiments discussed herein,
 supplying 104 the fluid mixture which are of different densities via the separator inlet 19 to the separation space 18;
 discharging 106 a first separated phase from the separation space 18 via the first separator outlet 33; and
 discharging 108 a second separated phase from the separation space via the second separator outlet 34.

The invention is not limited to the embodiment disclosed but may be varied and modified within the scope of the claims set out below. The invention is not limited to the type of separator as shown in the Figures. The term "centrifugal separator" also comprises centrifugal separators with a substantially horizontally oriented axis of rotation and separator having a single liquid outlet.

The invention claimed is:

1. A centrifugal separator for separation of at least two components of a fluid mixture which are of different densities, said centrifugal separator comprising:
 a stationary frame;
 a spindle rotatably supported by the frame;
 a centrifuge rotor mounted to a first end of the spindle to rotate together with the spindle around an axis of rotation, wherein the centrifuge rotor comprises a rotor casing enclosing a separation space in which a stack of separation discs is arranged to rotate coaxially with the centrifuge rotor;
 a separator inlet extending into said separation space for supply of the fluid mixture to be separated;
 a first separator outlet for discharging a first separated phase from said separation space; and
 a second separator outlet for discharging a second separated phase from said separation space;

wherein said stack of separation discs comprises a set of axially aligned separation discs having a truncated conical shape with an inner surface and an outer surface and comprising a plurality spot-formed spacing members extending from a base from at least a first surface of the inner surface and the outer surface for providing interspaces between mutually adjacent separation discs, wherein said set of separation discs comprises at least 200 separation discs having a diameter of at least 300 mm, wherein the surface density of said spot-formed spacing members is above 50 spot-formed spacing members/ $dm^2$ throughout the first surface of the separation disc, wherein the first surface of each separation disc has a first region and a second region, the first region extending inwardly from a bottom edge of the separation disc and the second region extending inwardly from the first region, and wherein the first region has a higher density of the spot-formed spacing members than the second region.

2. The centrifugal separator according to claim 1, wherein said set of axially aligned separation discs comprises at least 250 separation discs.

3. The centrifugal separator according to claim 2, wherein said set of axially aligned separation discs has a diameter of at least 350 mm.

4. The centrifugal separator according to claim 2, wherein a base of each of the plurality of spot-formed spacing members extends to a width less than 5 mm along the surface of the separation disc.

5. The centrifugal separator according to claim 1, wherein said set of axially aligned separation discs has a diameter of at least 350 mm.

6. The centrifugal separator according to claim 5, wherein said base extends to a width less than 5 mm along the surface of the separation disc.

7. The centrifugal separator according to claim 1, wherein a base of each of the plurality of spot-formed spacing members extends to a width less than 5 mm along the surface of the separation disc.

8. The centrifugal separator according to claim 1, wherein a base of each of the plurality of spot-formed spacing members extends to a width less than 2 mm along the surface of the separation disc.

9. The centrifugal separator according to claim 1, wherein the first surface is free of spacing members other than said spot-formed spacing members.

10. The centrifugal separator according to claim 1, wherein said stack of separation discs is arranged so that said spot-formed spacing members are the major load-bearing elements in said stack of separation discs.

11. The centrifugal separator according to claim 1, further comprising a pump for supplying the fluid mixture to be separated at a flow rate that is above 60 $m^3$/hour.

12. The centrifugal separator according to claim 1, wherein at least one of said separator inlet, said first separator outlet, or said second separator outlet is mechanically hermetically sealed.

13. The centrifugal separator according to claim 1, wherein said spindle is hollow and forms part of said separator inlet so that the fluid mixture to be separated is supplied through said spindle.

14. The centrifugal separator according to claim 1, further comprising a third separator outlet for discharging a sludge phase from the periphery of the separation space.

15. A method for separating at least two components of a fluid mixture which are of different densities comprising the steps of:
  providing the centrifugal separator according to claim 1;
  supplying said fluid mixture which are of different densities via said separator inlet to said separation space;
  discharging a first separated phase from said separation space via said first separator outlet; and
  discharging a second separated phase from said separation space via said second separator outlet.

16. The method according to claim 15, wherein the step of supplying comprises supplying said fluid mixture at a flow rate above 60 $m^3$/h.

17. The method according to claim 15, wherein the fluid mixture to be separated comprises milk and said first separated phase comprises a cream phase and said second separated phase comprises a skimmed milk phase.

18. The centrifugal separator according to claim 1, wherein the first region is smaller than the second region.

* * * * *